(12) United States Patent
Lee et al.

(10) Patent No.: US 9,935,346 B2
(45) Date of Patent: Apr. 3, 2018

(54) BATTERY MODULE

(71) Applicant: LG Chem, Ltd., Seoul (KR)

(72) Inventors: Chul Kyu Lee, Daejeon (KR); Hyung Ku Yun, Daejeon (KR); Bum Young Jung, Daejeon (KR); Seung Ryul Choi, Daejeon (KR); Sun Mo An, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/771,941

(22) PCT Filed: May 22, 2015

(86) PCT No.: PCT/KR2015/005158
§ 371 (c)(1),
(2) Date: Sep. 1, 2015

(87) PCT Pub. No.: WO2016/032092
PCT Pub. Date: Mar. 3, 2016

(65) Prior Publication Data
US 2016/0197387 A1    Jul. 7, 2016

(30) Foreign Application Priority Data

Aug. 29, 2014    (KR) ........................ 10-2014-0114369

(51) Int. Cl.
*H01M 10/6567* (2014.01)
*H01M 10/653* (2014.01)
(Continued)

(52) U.S. Cl.
CPC ......... *H01M 10/6567* (2015.04); *B60L 11/18* (2013.01); *H01M 2/021* (2013.01);
(Continued)

(58) Field of Classification Search
CPC ..................................................... H01M 10/60
(Continued)

(56) References Cited

U.S. PATENT DOCUMENTS 5,338,624 A * 8/1994 Gruenstern ......... H01M 2/0207
429/120
2007/0292751 A1 12/2007 Cherng et al.
(Continued)

FOREIGN PATENT DOCUMENTS

EP    3002804 A1    4/2016
JP    2002291670    10/2002
(Continued)

OTHER PUBLICATIONS

International Search Report for Application No. PCT/KR/2015/005158 dated Jul. 24, 2015.
(Continued)

*Primary Examiner* — James Lee
(74) *Attorney, Agent, or Firm* — Lerner, David, Littenberg, Krumholz & Mentlik, LLP (57) ABSTRACT

The present invention relates to a battery module, which includes one or more battery cell units, and the battery cell unit includes a battery cell, a fixing member located surrounding an outer circumference surface of the battery cell, and a heat absorbing material located between the battery cell and the fixing member, and as a result, heat generation inside the battery module is suppressed, and ignition between the series-connected battery cell units may be suppressed. Accordingly, excellent charge and discharge efficiency, an excellent cycle property and a lifespan property of the battery may be exhibited without concern for explosion or ignition of the battery module.

15 Claims, 5 Drawing Sheets

(51) Int. Cl.
   *H01M 10/659* (2014.01)
   *H01M 10/613* (2014.01)
   *H01M 10/625* (2014.01)
   *H01M 10/651* (2014.01)
   *H01M 10/0525* (2010.01)
   *B60L 11/18* (2006.01)
   *H01M 2/02* (2006.01)
   *H01M 2/10* (2006.01)
   *H01M 10/647* (2014.01)
   *H01M 10/658* (2014.01)
   *H01M 10/058* (2010.01)

(52) U.S. Cl.
   CPC ....... *H01M 2/0212* (2013.01); *H01M 2/0275* (2013.01); *H01M 2/0287* (2013.01); *H01M 2/1061* (2013.01); *H01M 2/1077* (2013.01); *H01M 2/1094* (2013.01); *H01M 10/0525* (2013.01); *H01M 10/613* (2015.04); *H01M 10/625* (2015.04); *H01M 10/647* (2015.04); *H01M 10/651* (2015.04); *H01M 10/653* (2015.04); *H01M 10/658* (2015.04); *H01M 10/659* (2015.04); *H01M 10/058* (2013.01); *H01M 2220/20* (2013.01); *Y02T 10/7011* (2013.01)

(58) Field of Classification Search
   USPC ........................................................ 429/120
   See application file for complete search history.

(56) References Cited

U.S. PATENT DOCUMENTS

| | | | | |
|---|---|---|---|---|
| 2008/0241663 | A1* | 10/2008 | Yamashita | H01M 2/021 429/122 |
| 2009/0047572 | A1* | 2/2009 | Pynenburg | H01M 2/1022 429/100 |
| 2009/0111010 | A1* | 4/2009 | Okada | H01M 10/613 429/120 |
| 2010/0310911 | A1 | 12/2010 | Yamamoto et al. | |
| 2011/0070474 | A1 | 3/2011 | Lee et al. | |
| 2011/0293986 | A1 | 12/2011 | Kozu | |
| 2012/0040223 | A1* | 2/2012 | Odumodu | H01M 2/1077 429/120 |
| 2012/0214033 | A1 | 8/2012 | Damon et al. | |
| 2013/0071720 | A1* | 3/2013 | Zahn | H01M 2/1077 429/120 |
| 2014/0099527 | A1 | 4/2014 | Seong et al. | |
| 2015/0118541 | A1 | 4/2015 | Seong et al. | |
| 2016/0133898 | A1 | 5/2016 | Choi et al. | |

FOREIGN PATENT DOCUMENTS

| | | |
|---|---|---|
| JP | 2010282795 | 12/2010 |
| JP | 2011204395 | 10/2011 |
| JP | 2012084322 A | 4/2012 |
| JP | 2012084326 A | 4/2012 |
| JP | 2012084346 A | 4/2012 |
| KR | 20100109871 | 10/2010 |
| KR | 20110084959 A | 7/2011 |
| KR | 20130125341 A | 11/2013 |
| KR | 20140024502 A | 3/2014 |

OTHER PUBLICATIONS

Extended search report from European Application No. 15753304.3, dated Jul. 19, 2016.

* cited by examiner

BATTERY MODULE

CROSS-REFERENCE TO RELATED APPLICATIONS

This application is a national phase entry under 35 U.S.C. § 371 of International Application No. PCT/KR2015/005158, filed May 22, 2015, published in Korean, which claims priority to Korean Patent Application No. 10-2014-0114369, filed on Aug. 29, 2014, the disclosures of which are incorporated herein by reference.

TECHNICAL FIELD

The present disclosure relates to a battery module capable of enhancing a lifespan property, a cycle property, and charge and discharge efficiency of the battery by suppressing heat generation inside the battery module.

BACKGROUND ART

Secondary batteries capable of charge and discharge have been widely used recently as an energy source of wireless mobile devices. In addition, secondary batteries also have attracted an attention as an energy source of electric vehicles, hybrid electric vehicles and the like provided as means for solving air pollution problems of existing gasoline vehicles or diesel vehicles using fossil fuels. Due to many other advantages of secondary batteries, the types of applications using secondary batteries have been widely diversified, and secondary batteries are expected to be used in products from more various fields in the future.

Secondary batteries have different constitutions depending on output and capacity required in the fields and products using such secondary batteries. For example, small mobile devices such as mobile phones, PDAs, digital cameras and lap-top computers use a small battery pack including one, or two, three or four battery cells per one device in order to respond to trends of miniaturization, weight reduction and thinning of the corresponding products. Meanwhile, medium and large size devices such as electric bicycles, electric vehicles or hybrid electric vehicles use a medium and large size battery pack electrically connected to a plurality of battery cells due to the necessity of high output and high capacity. Sizes and weights of a battery pack are directly related to storage space, output and the like of the corresponding medium and large size devices and the like, therefore, manufacturing companies make an effort to prepare a small and light battery pack as possible. Nickel-hydrogen secondary batteries have been most widely used as a battery cell of a battery pack, however, lithium secondary batteries providing high output considering capacity have been extensively studied recently, and some of the lithium secondary batteries have been commercialized.

However, lithium secondary batteries have a fundamental problem of having low stability. Specifically, much heat is generated inside a battery pack when charging and discharging a lithium secondary battery. Among these, much heat is generated in a battery cell, particularly, an electrical region such as an electrode terminal or connector. Moreover, an insulation property is mostly required for an electrode terminal, a connector or the like in the constitution of electrical connection, and in many cases, the electrode terminal or connector is supported on an insulation member, or an insulation member is inserted in a specific structure. Accordingly, heat generated in the electrode terminal or connector is not able to be effectively released, and tends to be accumulated. As a result, deformation occurs in the electrode terminal, the connector or the like and ultimately causes changes in the resistance of a battery pack.

Such changes in the resistance worsen an operating condition and stability of a battery pack, therefore, need to be suppressed. Particularly, heat accumulation may become a serious issue in terms of stability in a medium and large size battery pack using a plurality of battery cells, and in a battery pack using a lithium secondary battery as a battery cell. Accordingly, needs for technologies capable of fundamentally solving such a problem have increased.

DISCLOSURE OF THE INVENTION

Technical Problem

The present invention has been made in view of the above, and an object of the present invention is to provide a battery module capable of enhancing a lifespan property, a cycle property, and charge and discharge efficiency of the battery by suppressing a temperature increase inside the battery module through absorbing heat generated inside the battery module, and also preventing ignition between series-connected battery cell units.

Technical Solution

An embodiment of the present invention provides a battery module including one or more battery cell units, wherein the battery cell unit comprises a battery cell, a fixing member located surrounding an outer circumference surface of the battery cell, and a heat absorbing material located between the battery cell and the fixing member.

Another embodiment of the present invention provides a battery pack including the battery module as a unit module.

Still another embodiment of the present invention provides a device including the battery pack.

Advantageous Effects

In a battery module according to the present invention, a battery cell unit including a battery cell and a fixing member located surrounding an outer circumference surface of the battery cell comprises a heat absorbing material between the battery cell and the fixing member, and consequently, a temperature increase inside the battery module can be suppressed by absorbing heat generated inside the battery module, and ignition between the series-connected battery cell units can be also prevented. As a result, excellent charge and discharge efficiency, an excellent cycle property and an excellent lifespan property of the battery can be exhibited without concern for explosion or ignition of the battery module.

BRIEF DESCRIPTION OF THE DRAWINGS

The following drawings attached to the present specification illustrate preferred embodiments of the present invention, and perform a role of further enlightening technological ideas of the present invention together with the descriptions described above, and therefore, the present invention is not to be interpreted limitative only to the particulars described in such drawings.

[Description of the Symbols]

| | |
|---|---|
| 100: Battery Cell | 110: Pouch-Type Battery Case |
| 112: Storage Unit | 114: Upper Case |
| 116: Lower Case | 120: Electrode Assembly |
| 122: Positive Electrode Tap | 124: Negative Electrode Tap |
| 132, 134: Electrode Terminal | 140: Insulation Film |
| 200: Battery Module | 210: Fixing member |
| 220: Heat Absorbing Material | 300: Battery Cell Unit |
| 301: First Battery Cell Unit | 302: Second Battery Cell Unit |

MODE FOR CARRYING OUT THE INVENTION

Hereinafter, embodiments of the present invention will be described in detail with reference to the appended drawings for those skilled in the art to readily carry out the invention. However, the present invention may be carried out in various different forms, and is not limited to the embodiments described herein.

A battery module according to an embodiment of the present invention includes one or more battery cell units, and the battery cell unit includes a battery cell, a fixing member located surrounding an outer circumference surface of the battery cell, and a heat absorbing material located between the battery cell and the fixing member.

Heat generated inside a battery cell unit is usually released through a micro gap between an outer circumference surface of a battery cell and a fixing member. Regarding this, in the present invention, by placing a heat absorbing material between the outer circumference surface of the battery cell and the fixing member, a temperature increase inside the battery module may be suppressed through effectively absorbing the heat generated in the battery cell unit. In addition, by forming a heat absorbing material at the location such as above, excellent heat absorption efficiency may be obtained while minimizing the amount of the heat absorbing material used compared to a case placing a heat absorbing material on the whole surface of a battery cell unit or at an interface layer with a unit cell of an adjacent battery cell. In addition, by the heat absorbing material such as above absorbing heat generated inside a battery module, a positive electrode or negative electrode material goes through a chemical reaction due to high-temperature heat generated inside the battery module, and as a result, battery ignition or explosion may be prevented, and ignition between the series-connected battery cell units may be prevented.

Figure 1:
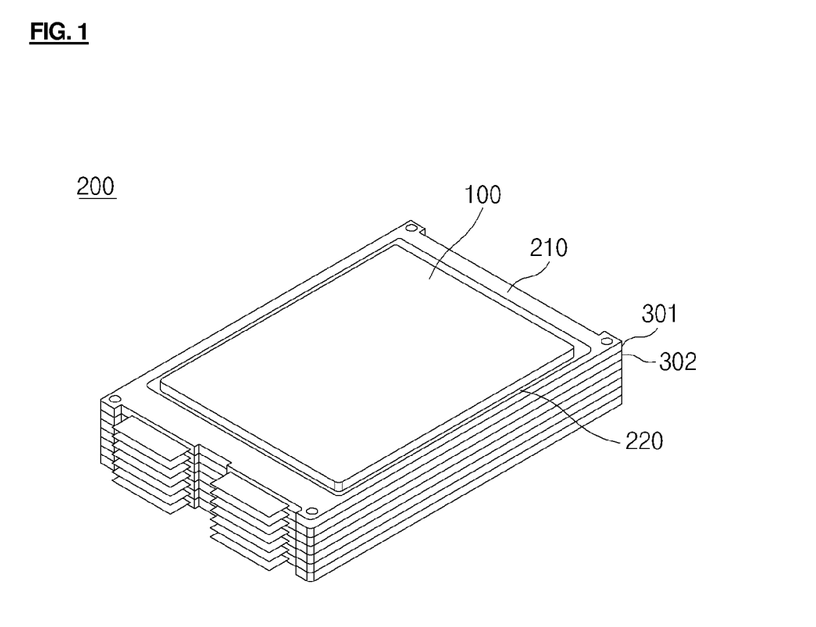
FIG. 1 is a perspective view of a battery module according to an embodiment of the present invention.
Figure 2:
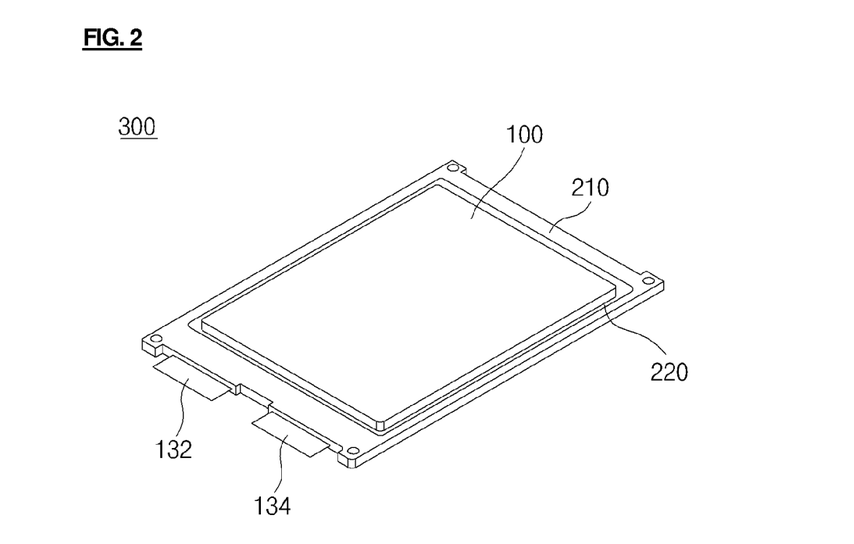
FIG. 2 is a perspective view of one battery cell unit included in the battery module of FIG. 1.

FIG. 1 is a perspective view of a battery module according to an embodiment of the present invention, and FIG. 2 is a perspective view of one battery cell unit included in the battery module. FIG. 1 and FIG. 2 are for illustrative purposes only, and the present invention is not limited thereto. In addition, a housing, a cable, a safety circuit and the like generally included in a battery module are not shown in FIG. 1 for the convenience of description.

When referring to FIG. 1 and FIG. 2, a battery module 200 according to an embodiment of the present invention includes one or more, or two or more battery cell units 300 such as a first battery cell unit 301 and a second battery cell unit 302. In addition, when the battery module 200 includes two or more battery cell units, each battery cell unit may be included forming a laminated structure in which each of the battery cell units is laminated in consecutive order.

Meanwhile, in the battery module 200, the battery cell unit 300 includes a battery cell 100, a fixing member 210 located surrounding an outer circumference surface of the battery cell, and a heat absorbing material 220 located between the battery cell and the fixing member.

In the battery cell unit 300, the battery cell 100 is not particularly limited as long as it is capable of providing a high voltage and a high current when constituting a battery module or battery pack, and examples thereof may include a lithium secondary battery having a large energy storage amount per volume.

In addition, the battery cell 100 may be a plate-type battery cell providing a high lamination factor in limited space, and when the battery module 200 includes two or more battery cell units, one or both surfaces of the plate-type battery cell may be laminated to be arranged to face a battery cell in the adjacent battery cell unit.

In addition, the plate-type battery cell includes a laminate sheet case including a resin layer and a metal layer, and an electrode assembly built in the case, and may be a pouch-type battery cell in which an outer circumference surface of the case is sealed by thermal bonding and the like.

More specifically, the battery cell 100 is a pouch-type battery cell in which an electrode assembly having a structure of a positive electrode/separator/negative electrode is sealed inside a battery case together with an electrolyte, and may be formed as a plate-type, which is an approximate rectangular parallelepiped structure generally having a small thickness compared to a width. Such a pouch-type battery cell is generally formed with a pouch-type battery case, and the battery case may be formed in a laminate sheet structure in which an outer coating layer formed with a polymer resin having excellent durability; a blocking layer formed with a metal material exhibiting a barrier property against moisture, air and the like; and an inner sealant layer formed with a thermally bondable polymer resin are laminated in consecutive order.

In addition, when the battery cell 100 is a pouch-type battery cell, the battery cell 100 may be fixed by a fixing member 210 integrally combined so as to surround an outer circumference surface of the pouch-type battery cell sealed by thermal bonding.

Figure 3:
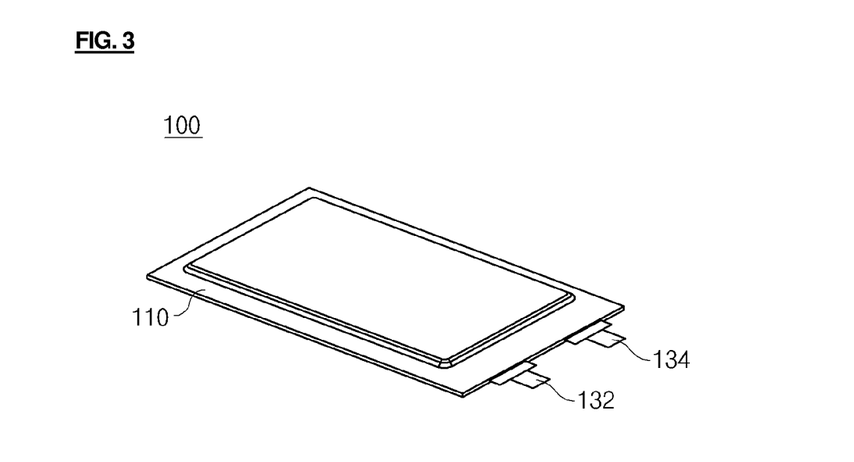
FIG. 3 is a perspective view of a battery cell included in a battery module according to an embodiment of the present invention.
Figure 4:
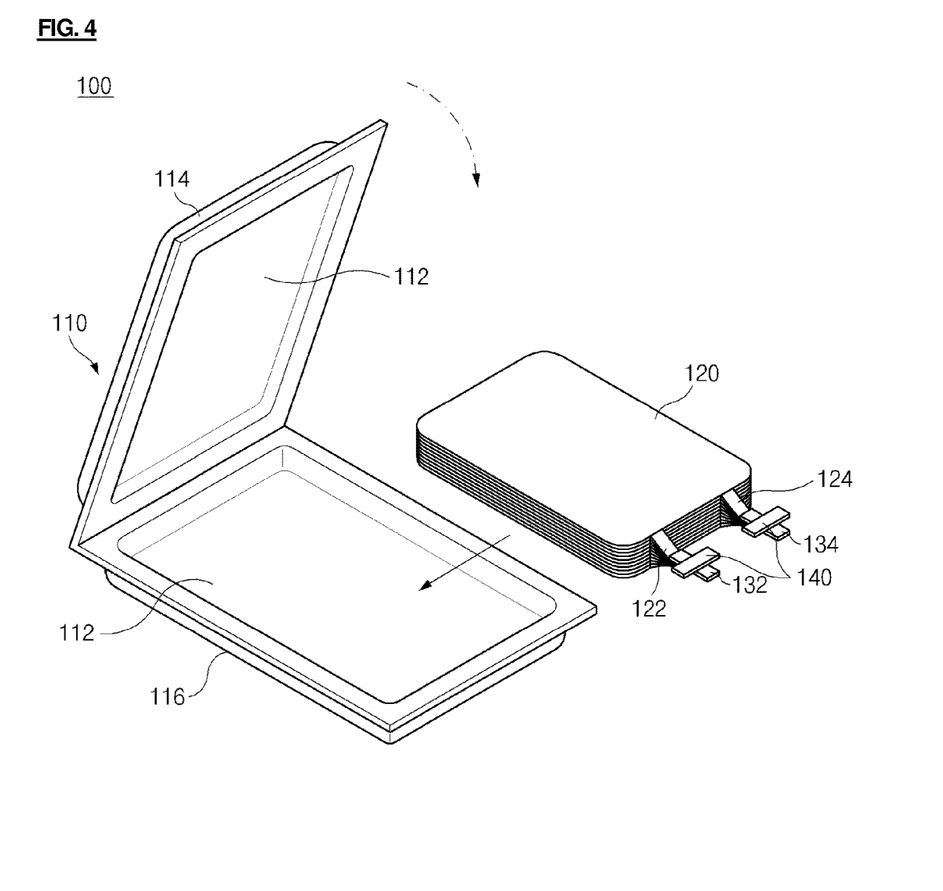
FIG. 4 is an exploded perspective view of FIG. 3.

FIG. 3 is a perspective view of a battery cell installed on a battery module according to an embodiment of the present invention, and FIG. 4 is an exploded perspective view of FIG. 3. FIG. 3 and FIG. 4 are for illustrative purposes only, and the present invention is not limited to the structures provided in FIG. 3 and FIG. 4.

When referring to FIG. 3 and FIG. 4, the battery cell 100 specifically has a structure in which, inside a pouch-type battery case 110, an electrode assembly 120 formed with a positive electrode, a negative electrode and a separator disposed therebetween is sealed so that its positive electrode and negative electrode taps 122, 124 and two electrically connected electrode terminals 132, 134 are exposed to the outside.

In the battery cell 100, the battery case 110 is formed with an upper case 114 and a lower case 116 including a concave-shaped storage unit 112 for the electrode assembly 120 to be safely settled.

In addition, in the battery cell 100, the electrode assembly 120 may have a folding-type, a stacking-type or a stack and folding-type structure folding, stacking, or stack and folding a laminated structure including a positive electrode, a negative electrode and a separator disposed therebetween.

In addition, in the electrode assembly 120, a plurality of positive electrode taps 122 and a plurality of negative electrode taps 124 are each bonded, and combined to electrode terminals 132, 134 together. Furthermore, an insulation film 140 may be further included on upper and lower surfaces of the electrode terminals 132, 134 so that, when an outer circumference surface of the upper case 114 and the lower case 116 of the battery case 110 are thermal bonded with a thermal bonding machine, the occurrence of short circuit between such a thermal bonding machine and the electrode terminals 132, 134 is prevented, and a sealing property between the electrode terminal 132, 134 and the battery case 110 is secured.

In addition, the battery cell 100 may have a structure in which a positive electrode terminal and a negative electrode terminal protrude on one side of the outer circumference surface; or a positive electrode terminal protrudes on one side of the outer circumference surface, and a negative electrode terminal protrudes on the opposite side. Herein, the battery cell 100 may have a structure in which a fixing member 210 is integrally combined to the whole outer circumference surface except for the positive electrode terminal and the negative electrode terminal.

Meanwhile, in the battery cell unit 200, a fixing member 210 is located on an outer circumference surface of the battery cell 100, as shown in FIG. 1 and FIG. 2.

The fixing member 210 is integrally combined to a part or the whole of an outer circumference surface of the battery cell 100, and performs a role of fixing the battery cell 100. Materials of the fixing member 210 are not particularly limited, and examples thereof may include rubber or plastic. More specifically, the fixing member may be formed with thermoplastic polyurethane (TPU), a silicone-based resin or the like, which is an elastic material. The fixing member 210 formed with such a material having elasticity fixes the battery cell 100, accurately fixes the battery cell 100 without adding an immoderate pressure, and absorbs shock even when external force and vibration are applied, and as a result, is capable of enhancing stability of the battery cell 100.

In addition, the combining of a part or the whole of an outer circumference surface of the battery cell 100 and the fixing member 210 may be achieved using various methods such as assembly, adhesion and molding, and more specifically, an integrally combined structure by insert injection molding may be obtained. In other words, an outer circumference surface of the battery cell 100 is combined to the fixing member 210 by insert injection molding, and as a result, the battery cell 100 may be stably attached to the fixing member 210.

In addition, in the battery cell unit 200, a heat absorbing material 220 is located between an outer circumference surface of the battery cell 100 and the fixing member 210.

Specifically, the heat absorbing material 220 may be formed on at least a part of a surface on which an outer circumference surface of the battery cell 100 and the fixing member 210 are in contact with each other, and more specifically, may be formed on the whole surface on which an outer circumference surface of the battery cell 100 and the fixing member 210 are in contact with each other.

In addition, when the battery module includes two or more battery cell units, the heat absorbing material 220 may be selectively further included between the battery cell units, that is, between a surface of one battery cell unit and a facing surface of an adjacent battery cell unit in a laminated structure of the battery cell unit, as well as on the surface on which an outer circumference surface of the battery cell 100 and the fixing member 210 are in contact with each other. Specifically, the heat absorbing material 220 may be included between the first battery cell unit 301 and the second battery cell unit 302.

Furthermore, the battery module may include two or more battery cell units, and a surface of the battery cell unit and a facing surface of the adjacent battery cell unit may be in contact with each other while having a heat absorbing material provided therebetween. In other words, a surface of the battery cell unit and a facing surface of the adjacent battery cell unit may be in contact with each other while a heat absorbing material being provided therebetween.

As described above, by the battery cell unit 300 including a heat absorbing material 220 on at least a part of a surface on which an outer circumference surface of the battery cell 100 and the fixing member 210 are in contact with each other, and between facing surfaces of the first battery cell unit 301 and the battery cell unit 302, additional ignition between the series-connected battery cell units 301, 302 may be suppressed, and a temperature increase in a battery module 200 may be suppressed by absorbing the heat generated inside the battery module 200. As a result, explosion and ignition of the battery module 200 may be prevented, and charge and discharge efficiency of batteries, a cycle property and a lifespan property of a battery may be further enhanced.

Specifically, the heat absorbing material 220 includes water ($H_2O$) and silica.

As for the water, pure water that does not include impurities is preferable without concern of side reactions.

In addition, the water may be included in 75 to 95% by weight based on the total weight of the heat absorbing material. When the water content is less than 75% by weight in the heat absorbing material, the content of silica relatively increases, causing decline in a heat absorbing property. When the water content is greater than 95% by weight, the content of silica relatively decreases, causing decline in a heat absorbing property. When considering the significance of improvement effects by including water in the heat absorbing material, the pure water is preferably included in 80 to 90% by weight based on the total weight of the heat absorbing material.

Meanwhile, in the heat absorbing material, silica ($SiO_2$) is a material exhibiting not only high thermal stability itself but more excellent heat absorbing property among various heat absorbing inorganic materials. The silica may be crystalline or amorphous, or a mixture of crystalline and amorphous silica. In addition, as the crystalline silica, polymorphism such as quartz, tridymite or cristobalite having higher thermal stability may be specifically included, and any one, or a mixture of two or more of these may be used.

The silica may be included in 5 to 25% by weight based on the total weight of the heat absorbing material. When the silica content is less than 5% by weight, the silica content is too small, causing decline in a heat absorbing property, and the role of a heat absorbing material may not be properly performed. When the silica content is greater than 25% by weight, a heat absorbing property may decline. When considering the significance of improvement effects by including silica in the heat absorbing material, the silica is more specifically included in 10 to 20% by weight based on the total weight of the heat absorbing material.

Another embodiment of the present invention provides a battery pack including the battery module 200 as a unit module.

The battery pack may be manufactured assembling the battery module described above as a unit module depending on a target output and capacity. The battery pack may be used as a power supply of electric vehicles, hybrid electric vehicles, plug-in hybrid electric vehicles, power storage devices and the like considering installment efficiency, structural stability and the like, however, the application scope is not limited thereto.

Still another embodiment of the present invention provides a device using the battery pack as a power supply.

Specifically, the device may be electric vehicles, hybrid electric vehicles, plug-in hybrid electric vehicles or power storage devices. Structures and manufacturing methods of such devices are known in the art, therefore, detailed descriptions thereon will not be included in the present specification.

Hereinafter, the present invention will be described more specifically with reference to examples. However, the following examples are for illustrative purposes only, and the scope of the present invention is not limited thereto.

EXAMPLE 1

Manufacture of Battery Module

A battery module having a structure as shown in FIG. 1 to FIG. 4 was manufactured.

Specifically, an aqueous negative electrode slurry was prepared by adding 97% by weight of artificial graphite as a negative electrode active material, 1.5% by weight of carboxymethyl cellulose (CMC) and 1.5% by weight of a styrene-butadiene rubber (SBR) binder to a mixed solvent of water and ethanol (mixed volume ratio of water and ethanol=90:10), and then the aqueous negative electrode slurry was coated on copper (Cu) foil, dried and rolled to prepare a negative electrode.

In addition, a positive electrode slurry was prepared by adding 95% by weight of $LiCoO_2$ as a positive electrode active material, 3% by weight of Super-P (conductor), and 2% by weight of an SBR binder to a mixed solvent of water and ethanol (mixed volume ratio of water and ethanol=90:10), and then the positive electrode slurry was coated on aluminum foil, dried and rolled to prepare a positive electrode.

After an electrode assembly was prepared by providing a polyolefin separator between the prepared negative electrode and the positive electrode, the electrode assembly was sealed by being placed in a pouch, and a battery cell 100 was prepared by injecting an electrolyte into the pouch. Herein, ethylene carbonate (EC)/ethylmethyl carbonate (EMC)-based solution (mixed weight ratio of EC/EMC=2:8) containing 1 M $LiPF_6$ was used as an electrolyte.

A heat absorbing material 220 including water and silica in a mixed weight ratio of 80:20 was coated so as to surround an outer circumference surface of the prepared battery cell 100, and then a battery cell unit 300 was prepared by combining a plastic fixing member thereto. 6 of such battery cell units 300 were laminated (Cell #1, 2, 3, 4, 5, 6) to manufacture a battery module 200.

EXAMPLE 2

Manufacture of Battery Module

A battery module was manufactured in the same manner as in Example 1 except that 3 battery cell units were laminated.

EXAMPLE 3

Manufacture of Battery Module

A battery module was manufactured in the same manner as in Example 1 except that a heat absorbing material was further formed between a surface of the battery cell unit and a facing surface of the adjacent battery cell unit by coating the heat absorbing material between every laminated battery cells when laminating the battery cell units (Cell #1, 2, 3, 4, 5, 6).

COMPARATIVE EXAMPLE

Manufacture of Battery Module

A battery module was manufactured in the same manner as in Example 1 except that a heat absorbing material was not formed on an outer circumference surface of the battery cell, and 5 battery cell units were laminated.

[Test Example: Nail Test on Battery Module]

On the battery module manufactured in Example 1 and the comparative example, a nail test in which a nail goes through 3 battery cell units was carried out. The results are shown in FIG. 5 and FIG. 6.

Figure 5:
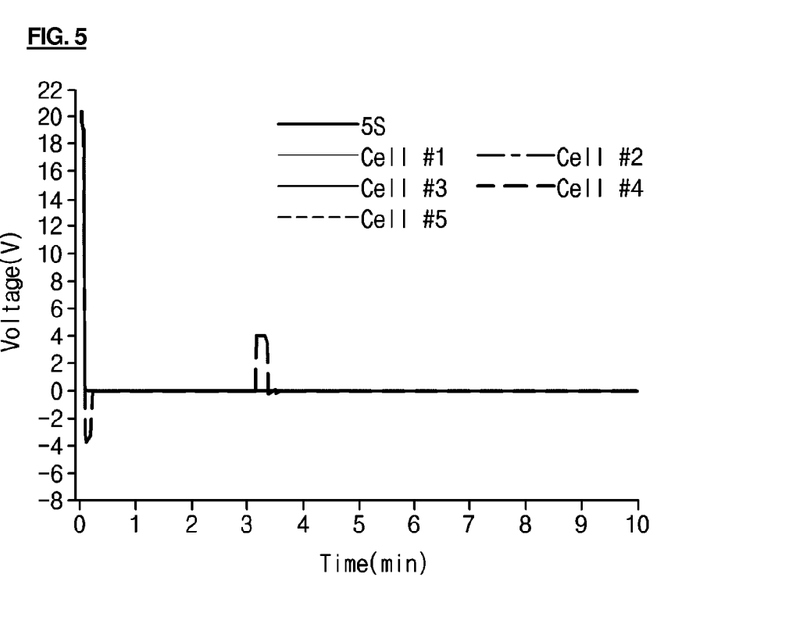
FIG. 5 is a graph showing a nail test result of a comparative example.
Figure 6:
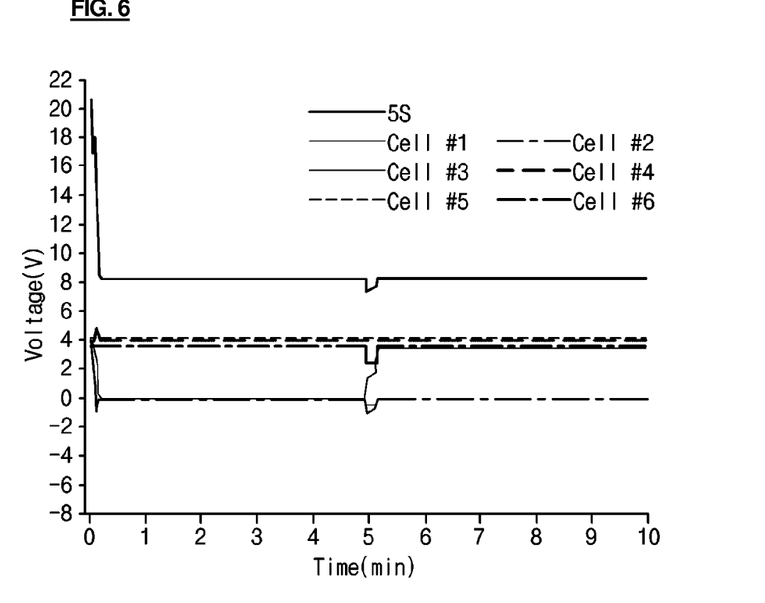
FIG. 6 is a graph showing a nail test result of Example 1.

FIG. 5 is a graph showing the nail test result for the battery module of the comparative example, and FIG. 6 is a graph showing the nail test result for the battery module of Example 1.

As shown in FIG. 5, in the battery module of the comparative example in which a heat absorbing material was not coated, not only the 3 battery cell units (Cell #1, 2, 3) through which a nail penetrated in the nail test, but the remaining battery cell units adjacent to 3 battery cell units through which a nail penetrated were exploded and ignited from the transfer of the heat generated inside, and as a result, performances as a battery were not able to be accomplished.

However, as shown in FIG. 6, in the battery module of Example 1 in which a heat absorbing material was coated, the 3 battery cell units through which a nail penetrated lost function as a battery, however, in the battery cell units through which the nail did not penetrate, the coated heat absorbing material absorbs the heat generated inside the battery module and blocks the transfer of the heat to the surrounding adjacent batteries, and battery function was exhibited without explosion and ignition.

From the test results as above, it can be seen that the battery module according to an embodiment of the present invention includes a heat absorbing material on at least a part of a surface on which an outer circumference surface of a battery cell and a fixing member are in contact with each other, and therefore, the heat absorbing material absorbs heat generated inside the battery module and suppresses the heat generation, and suppresses additional ignition between the series connected battery cell units, and as a result, explosion and ignition of the battery module is capable of being prevented.

The invention claimed is:

1. A battery module comprising one or more battery cell units,
    wherein at least one of the one or more battery cell units comprises a battery cell, a fixing member located surrounding an outer circumference surface of the battery cell, and a heat absorbing material located between the battery cell and the fixing member,
    wherein the heat absorbing material comprises water and silica, and
    wherein the silica comprises at least one selected from the group consisted of quartz, tridymite and cristobalite.

2. The battery module of claim 1, wherein the one or more battery cell units comprises two or more battery cell units, and the battery module further comprises a second heat absorbing material between a surface of one of the two or more battery cell units and a facing surface of an adjacent one of the two or more battery cell units.

3. The battery module of claim 1, wherein the one or more battery cell units comprises two or more battery cell units, and a surface of one of the two or more battery cell units and a facing surface of an adjacent one of the two or more battery cell units are in contact with each other while having a second heat absorbing material provided therebetween.

4. The battery module of claim 1, wherein the battery cell is a plate-type battery cell, and the one or more battery cell units comprises two or more battery cell units, and one or both surfaces of the plate-type battery cell are laminated to be arranged so as to face the battery cell in an adjacent one of the two or more battery cell units, respectively.

5. The battery module of claim 4, wherein the plate-type battery cell is a pouch-type battery cell which comprises a laminate sheet case, in which a resin layer and a metal layer are laminated in sequence, and an electrode assembly built in the case, and an outer circumference surface of the case is sealed.

6. The battery module of claim 5, wherein the fixing member is integrally combined so as to surround the outer circumference surface of the sealed pouch-type battery cell.

7. The battery module of claim 1, wherein a positive electrode terminal and a negative electrode terminal protrude on one side of the outer circumference surface of the battery cell; or a positive electrode terminal protrudes on one side of the outer circumference surface, and a negative electrode terminal protrudes on an opposite side.

8. The battery module of claim 7, wherein the fixing member is integrally combined to the whole outer circumference surface except for the positive electrode terminal and the negative electrode terminal.

9. The battery module of claim 1, wherein the fixing member comprises rubber or plastic.

10. The battery module of claim 1, wherein the fixing member comprises a silicone-based resin or thermoplastic polyurethane.

11. The battery module of claim 1, wherein the heat absorbing material comprises water in 75 to 95% by weight and silica in 5 to 25% by weight.

12. The battery module of claim 1, wherein the battery cell is a lithium secondary battery.

13. A battery pack comprising the battery module of claim 1 as a unit module.

14. A device comprising the battery pack of claim 13.

15. The device of claim 14, which is selected from the group consisted of electric vehicles, hybrid electric vehicles, plug-in hybrid electric vehicles and power storage devices.

* * * * *